June 24, 1924.

V. E. DENNIS 1,499,156

SPARE TIRE CARRIER FOR MOTOR DRIVEN VEHICLES

Filed May 15, 1922     2 Sheets-Sheet 1

V. E. Dennis, INVENTOR.

BY Geo. F. Kimmel ATTORNEY.

June 24, 1924.
V. E. DENNIS
1,499,156
SPARE TIRE CARRIER FOR MOTOR DRIVEN VEHICLES
Filed May 15, 1922  2 Sheets-Sheet 2
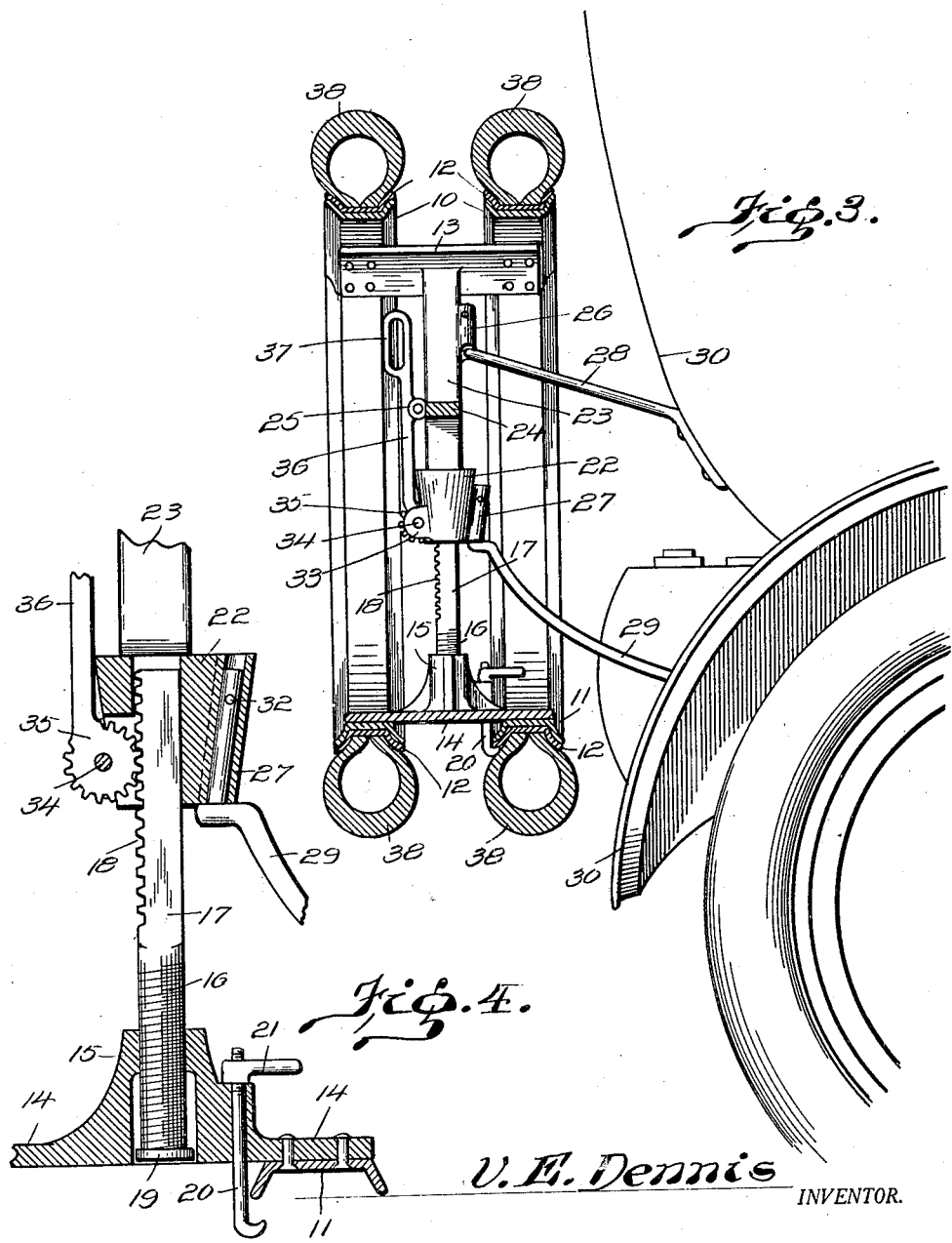

Patented June 24, 1924.

1,499,156

UNITED STATES PATENT OFFICE.

VACE E. DENNIS, OF BUTTE, MONTANA, ASSIGNOR TO THE UNIVERSAL MANUFACTURING COMPANY, OF BUTTE, MONTANA, A CORPORATION OF MONTANA.

SPARE-TIRE CARRIER FOR MOTOR-DRIVEN VEHICLES.

Application filed May 15, 1922. Serial No. 561,111.

*To all whom it may concern:*

Be it known that I, VACE E. DENNIS, a citizen of the United States, residing at Butte, in the county of Silver Bow and State of Montana, have invented certain new and useful Improvements in Spare-Tire Carriers for Motor-Driven Vehicles, of which the following is a specification.

This invention relates to carriers for the spare tires of motor driven vehicles, and has for one of its objects to improve the construction and increase the efficiency and utility of devices of this character.

Another object of this invention is to provide a device of this character which may be adapted to motor driven vehicles of various forms and sizes without material structural change, and without interfering with the ordinary operation of the vehicle.

Another object of the invention is to provide a device of this character having means for adjusting the supporting devices to fit tires of varying sizes and to lock the supporting device from surreptitious removal.

With these and other objects in view the invention consists in certain novel features of construction as hereinafter shown and described and then specifically pointed out in the claim, and in the drawings illustrative of the preferred embodiment of the invention:—

Fig. 3 is a vertical section with portions of a conventional motor driven vehicle and with the improved device attached.

Fig. 4 is an enlarged sectional detail.

Figure 1:
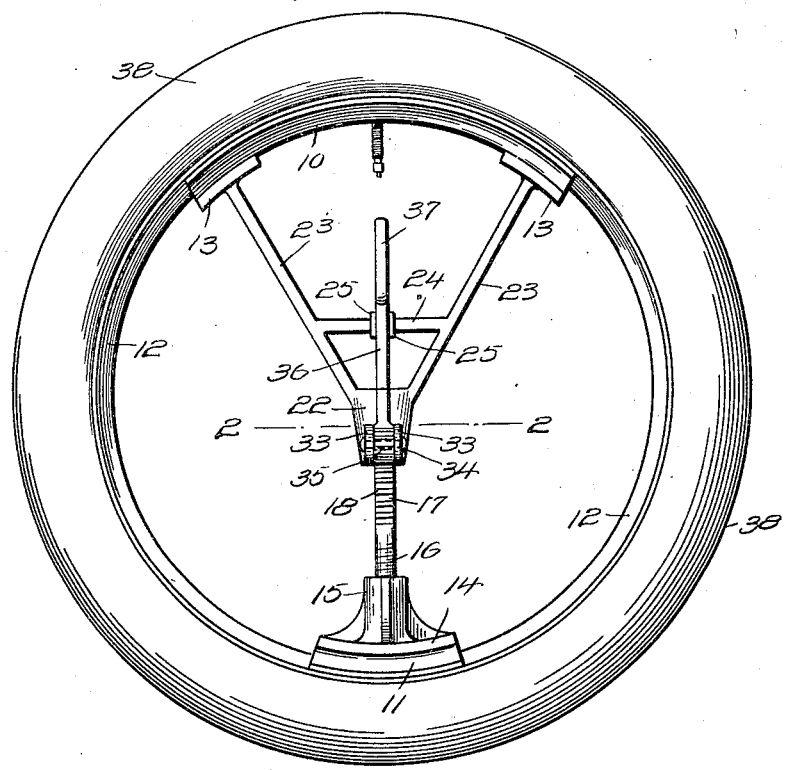
Figure 1 is a side elevation of the improved device applied to a conventional tire rim and tire.

The improved device comprises a relatively long curved bearing plate 10 and a relatively short curved bearing plate 11, the curvatures of the plates corresponding substantially to the curvatures of the wheel rim, indicated at 12, and longitudinally channeled to conform to the shape of the rim which they engage, as shown.

The members 10 and 11 are arranged in pairs as shown in Fig. 3 and the member 10 being connected at the ends by coupling members 13, while the members 11 are coupled by a coupling member 14.

By this arrangement two separate tires may be supported in the same holder, and if required the connecting plates 13 may be extended to support an additional holding device, if required.

Figure 2:
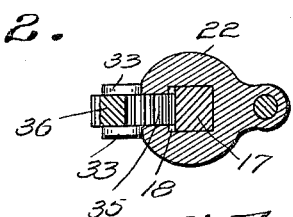
Fig. 2 is a transverse section on the line 2—2 of Fig. 1.

Extending from the coupling member 14 is an internally threaded socket 15, and engaging in the socket is the threaded portion 16 of a stock member 17, the latter being other form than round except where the threads 16 are applied, for instance, square, as shown in Fig. 2, and the irregular portion provided with a gear rack represented at 18.

At its lower end the stock 17 is provided with a stop collar 19, to prevent the stock from being accidentally withdrawn from the socket 15. The members 11 are rigidly attached to the member 14, as by riveting, as shown in Fig. 4, and the member 14 and its attached plates 11 clamped to the rim 12 by a plurality of hooked bolts 20 having finger nuts 21 whereby the member 14 and its attached coupling plates 11 may be firmly clamped to the tire rim engaging member 11.

Arranged to be slidably engaged by the stock 17 is a guide head 22, and branching from the guide head 22 are bars 23 connecting the head to the members 13. The branching members 23 are connected by a transverse stay 24, and extending from the stay are spaced perforated ears 25.

The branching bars 23 are provided with sockets, one of which is shown at 26, while the head member 22 is provided with similar sockets 27.

The sockets 26 are designed to receive upturned ends of supporting bars, one of which is shown at 28, while the socket 27 receives the upturned end of a supporting bar 29. At their opposite ends the bars 28 and 29 are rigidly connected to the vehicle, a portion of which is indicated conventionally at 30, by any suitable means.

By this means the holding device is rigidly supported from the vehicle.

The sockets 26 and 27 are transversely apertured as shown at 31 and 32, while the upturned portions of the bars 28 and 29 are correspondingly apertured, as indicated at 32, to receive holding pins or other fastening devices.

Extending from the head member 22 are perforated ears 33 to receive a transverse pin 34, and mounted for rotation on or with the pin is a pinion 35 in constant engagement with rack 18. An operating lever arm 36 extends from the pinion and terminates in a handle 37 and is provided with a perforated lug to be received between the ears 25 of the stay 24, the perforations of the ears 25 and the lugs of the lever 36 registering when the lever arm is in elevated position as shown in Figs. 1 and 3, to receive a suitable lock bolt, not shown.

The spare tires are indicated at 38 and when applied to the rims 12 and the latter engaged over the holding members 10 and 11 and the latter strained against the rim by actuating the pinion 35, and the holding device inserted through the spaced ears 33 and the lug of the lever arm 36, the tires will be firmly held in position and their surreptitious removal effectually prevented.

The holding devices operate effectually to prevent the displacement of the tires either by unauthorized persons, or from being shaken loose by the jars and concussions to which the vehicle is subjected when in use.

The improved device is simple in construction, can be manufactured at relatively slight expense, and operates effectually for the purposes described.

The preferred embodiment of the invention is disclosed in the drawings and set forth in the specification but it will be understood that modifications within the scope of the claimed invention may be made in the construction without departing from the principle of the invention or sacrificing any of its advantages.

Having thus described the invention what is claimed as new is:—

In a device of the character described, a head portion having a vertical guideway and adapted to be supported in engagement with a wheel rim, a coupling member adapted to engage a wheel rim and having an internal socket and a reduced internally threaded aperture communicating with the socket, a stock slidable in said guideway and with a portion threaded to engage the threaded portion of said coupling member and with portion of a laterally enlarged terminal to engage in the socket portion of the same, and means carried by said head member for adjusting said stock in the guideway therein.

In testimony whereof, I affix my signature hereto.

VACE E. DENNIS.